United States Patent
Li et al.

(10) Patent No.: US 11,836,546 B2
(45) Date of Patent: Dec. 5, 2023

(54) METHOD AND APPARATUS FOR READING AND WRITING CLIPBOARD INFORMATION AND STORAGE MEDIUM

(71) Applicant: BEIJING XIAOMI MOBILE SOFTWARE CO., LTD., Beijing (CN)

(72) Inventors: Dong Li, Beijing (CN); Lin Fan, Beijing (CN); Weidong Zhang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 179 days.

(21) Appl. No.: 17/330,244

(22) Filed: May 25, 2021

(65) Prior Publication Data

US 2022/0206882 A1    Jun. 30, 2022

(30) Foreign Application Priority Data

Dec. 25, 2020 (CN) .......................... 202011563297.4

(51) Int. Cl.
*G06F 3/048* (2013.01)
*G06F 9/54* (2006.01)
(Continued)

(52) U.S. Cl.
CPC .......... *G06F 9/543* (2013.01); *G06F 3/04812* (2013.01); *G06F 21/52* (2013.01); *G06F 2209/545* (2013.01); *G06F 2221/2141* (2013.01)

(58) Field of Classification Search
CPC ...... G06F 3/0482; G06F 40/166; G06F 9/543; G06F 3/0486; G06F 3/0488; G06F 3/048;
(Continued)

(56) References Cited

U.S. PATENT DOCUMENTS 7,870,493 B2 * 1/2011 Pall .......................... H04L 12/12
                                                          715/753
9,053,333 B2 * 6/2015 Furuichi ................. G06F 21/62
(Continued)

FOREIGN PATENT DOCUMENTS

WO      2016009085 A1     1/2016

OTHER PUBLICATIONS

Extended European Search Report in Application No. 21176773.6, dated Dec. 6, 2021.
(Continued)

*Primary Examiner* — Steven B Theriault
(74) *Attorney, Agent, or Firm* — SYNCODA LLC; Feng Ma

(57) ABSTRACT

A method for reading and writing clipboard information, applied to a terminal, includes: acquiring a request for reading and writing clipboard information; determining a read permission for clipboard information, in response to the request for reading and writing clipboard information including a request for reading clipboard information, and allowing to read the clipboard information or refusing to read the clipboard information based on the read permission; and determining a write permission for the clipboard information, in response to the request for reading and writing clipboard information including a request for writing clipboard information, and allowing or refusing to write the clipboard information based on the write permission. The read and write permission of the clipboard can be divided into the read permission and the write permission, thereby facilitating preventing leakage of the clipboard information in the clipboard and improving the security of the clipboard information.

14 Claims, 8 Drawing Sheets

(51) Int. Cl.
*G06F 3/04812* (2022.01)
*G06F 21/52* (2013.01)

(58) Field of Classification Search
CPC . G06F 8/71; G06F 21/6218; G06F 2221/2141
See application file for complete search history.

(56) References Cited

U.S. PATENT DOCUMENTS

| | | | | |
|---|---|---|---|---|
| 10,616,228 | B2* | 4/2020 | Nizhawan | G06F 21/50 |
| 10,885,525 | B1* | 1/2021 | Sharafi | G06Q 20/3674 |
| 2005/0066335 | A1* | 3/2005 | Aarts | G06F 9/543 |
| | | | | 719/316 |
| 2005/0172241 | A1* | 8/2005 | Daniels | G06F 9/543 |
| | | | | 715/770 |
| 2006/0117178 | A1* | 6/2006 | Miyamoto | G06F 21/6209 |
| | | | | 713/165 |
| 2007/0011749 | A1* | 1/2007 | Allison | G06F 21/6218 |
| | | | | 713/165 |
| 2007/0079249 | A1* | 4/2007 | Pall | G06F 9/546 |
| | | | | 715/758 |
| 2008/0028442 | A1* | 1/2008 | Kaza | H04L 63/145 |
| | | | | 726/4 |
| 2008/0256601 | A1* | 10/2008 | Dutta | G06F 21/6209 |
| | | | | 726/3 |
| 2008/0282180 | A1 | 11/2008 | Glasgow et al. | |
| 2009/0119772 | A1* | 5/2009 | Awad | G06F 21/6218 |
| | | | | 726/21 |
| 2011/0131179 | A1* | 6/2011 | Ohata | G06F 9/468 |
| | | | | 707/E17.005 |
| 2014/0013258 | A1* | 1/2014 | Jang | G06F 9/451 |
| | | | | 715/769 |
| 2014/0280132 | A1 | 9/2014 | Auger et al. | |
| 2015/0310220 | A1* | 10/2015 | Brooks | G06F 21/606 |
| | | | | 713/189 |
| 2016/0019104 | A1* | 1/2016 | Major | G06F 21/6218 |
| | | | | 719/319 |
| 2019/0227857 | A1* | 7/2019 | Koszek | G06F 21/6245 |
| 2019/0303596 | A1* | 10/2019 | Du | G06F 21/629 |
| 2022/0206995 | A1* | 6/2022 | Zadina | G06F 16/168 |

OTHER PUBLICATIONS

Kaan Onarlioglu et al., Overhaul: Input-Driven Access Control for Better Privacy on Traditional Operating Systems, 2016 46th Annual IEEE/IFIP international Conference on Dependable Systems and Networks.
Franziska Roesner, et al., User-Driven Access Control: Rethinking Permission Granting in Modern Operating Systems, 2012 IEEE Symposium on Security and Privacy.

* cited by examiner

METHOD AND APPARATUS FOR READING AND WRITING CLIPBOARD INFORMATION AND STORAGE MEDIUM

CROSS-REFERENCE TO RELATED APPLICATION

This application claims priority to Chinese Patent Application No. 202011563297.4 filed on Dec. 25, 2020, the disclosure of which is hereby incorporated by reference in its entirety.

BACKGROUND

A clipboard typically refers to a storage area provided by a terminal operating system that can temporarily store information, and share the information stored temporarily. The clipboard can be convenient for a user to edit or use the clipboard information stored in the clipboard.

SUMMARY

The present disclosure relates generally to the field of terminal technologies, and more specifically to a method for reading and writing clipboard information, an apparatus for reading and writing clipboard information and a storage medium.

According to a first aspect of embodiments of the present disclosure, there is provided a method for reading and writing clipboard information, applied to a terminal, the method for reading and writing clipboard information includes: acquiring a request for reading and writing clipboard information; determining a read permission for clipboard information, in response to the request for reading and writing clipboard information including a request for reading clipboard information, and allowing to read the clipboard information or refusing to read the clipboard information based on the read permission; and determining a write permission for the clipboard information, in response to the request for reading and writing clipboard information including a request for writing clipboard information, and allowing to write the clipboard information or refusing to write the clipboard information based on the write permission.

In some embodiments, the determining a read permission for clipboard information includes: determining that reading a permission set by default for the read permission for the clipboard information is allowed.

In some embodiments, the determining a write permission for the clipboard information includes: determining that the write permission for the clipboard information is to allow writing, in response to a clipboard function being executed.

In some embodiments, the request for reading clipboard information is a request for reading clipboard information for a first application to read the clipboard information. The determining a read permission for clipboard information includes: determining the read permission for the first application to read the clipboard information.

In some embodiments, the determining the read permission for the first application to read the clipboard information comprises: when a content format of the clipboard information matches a content format of the clipboard information to be read by the first application, determining that the first application has the read permission to read the clipboard information; and when the content format of the clipboard information does not match the content format of the clipboard information to be read by the first application, determining that the first application does not have the read permission to read the clipboard information.

In some embodiments, after allowing to read the clipboard information or refusing to read the clipboard information, the method for reading and writing clipboard information further comprises: displaying first prompt information on an application display interface of the first application, the first prompt information being used to prompt that the first application is allowed to read the clipboard information or that the first application is refused to read the clipboard information.

In some embodiments, the displaying first prompt information on an application display interface of the first application comprises: displaying the first prompt information for indicating that the first application is refused to read the clipboard information, in response to the first application being refused to read the clipboard information and the number of times the first application is refused to read the clipboard information reaching a first number threshold, and hiding the first prompt information after a predetermined time is reached.

In some embodiments, the displaying first prompt information on an application display interface of the first application comprises: displaying the first prompt information for indicating that the first application is refused to read the clipboard information, in response to the first application being refused to read the clipboard information and the number of times the first application is refused to read the clipboard information reaching a second number threshold, the first prompt information including a selection control for a user to determine whether to display the first prompt information again; and continuing or stopping displaying the first prompt information, based on the selection control triggered by the user.

In some embodiments, before displaying the first prompt information on the application display interface of the first application, the method for reading and writing clipboard information further comprises: determining that the request for reading clipboard information is a request for reading clipboard information that is not triggered by the user.

In some embodiments, the determining that the request for reading clipboard information is a request for reading clipboard information that is not triggered by the user comprises: when the request for reading clipboard information is triggered by a non-user-specific program call stack, determining that the request for reading clipboard information is a request for reading clipboard information that is not triggered by the user.

In some embodiments, after allowing to read the clipboard information, the method for reading and writing clipboard information further comprises: running and displaying a corresponding application display interface after the first application reads the clipboard information.

According to a second aspect of embodiments of the present disclosure, there is provided an apparatus for reading and writing clipboard information, applied to a terminal, the apparatus for reading and writing clipboard information comprises: an acquiring unit, configured to acquire a request for reading and writing clipboard information; and a determining unit, configured to determine a read permission for clipboard information, in response to the request for reading and writing clipboard information including a request for reading clipboard information, and allow to read the clipboard information or refuse to read the clipboard information based on the read permission, and the determining unit is further configured to determine a write permission for the clipboard information, in response to the request for reading and writing clipboard information including a request for writing clipboard information, and allow to write the clipboard information or refuse to write the clipboard information based on the write permission.

In some embodiments, the determining unit is configured to determine the read permission for the clipboard information in the following manner: determining that reading a permission set by default for the read permission for the clipboard information is allowed.

In some embodiments, the determining unit determines the write permission for the clipboard information in the following manner: determining that the write permission for the clipboard information is to allow writing, in response to a clipboard function being executed.

In some embodiments, the request for reading clipboard information is a request for reading clipboard information for a first application to read the clipboard information. The determining unit is configured to determine the read permission for the clipboard information in the following manner: determining the read permission for the first application to read the clipboard information.

In some embodiments, the determining unit is configured to determine the read permission for the first application to read the clipboard information in the following manner: when a content format of the clipboard information matches a content format of the clipboard information to be read by the first application, determining that the first application has the read permission to read the clipboard information; and when the content format of the clipboard information does not match the content format of the clipboard information to be read by the first application, determining that the first application does not have the read permission to read the clipboard information.

In some embodiments, after allowing to read the clipboard information or refusing to read the clipboard information, the apparatus for reading and writing clipboard information further comprises: a display unit, configured to display first prompt information on an application display interface of the first application, the first prompt information being used to prompt that the first application is allowed to read the clipboard information or that the first application is refused to read the clipboard information.

In some embodiments, the display unit is configured to display the first prompt information on the application display interface of the first application in the following manner: displaying the first prompt information for indicating that the first application is refused to read the clipboard information, and hiding the first prompt information after a predetermined time is reached, in response to the first application being refused to read the clipboard information and the number of times the first application is refused to read the clipboard information reaching a first number threshold.

In some embodiments, the display unit is configured to display the first prompt information on the application display interface of the first application in the following manner: displaying the first prompt information for indicating that the first application is refused to read the clipboard information, in response to the first application being refused to read the clipboard information and the number of times the first application is refused to read the clipboard information reaching a second number threshold, the first prompt information including a selection control for a user to determine whether to display the first prompt information again; and continuing or stopping displaying the first prompt information, based on the selection control triggered by the user.

In some embodiments, the determining unit is further configured to: determine that the request for reading clipboard information is a request for reading clipboard information that is not triggered by the user.

In some embodiments, the determining unit is configured to determine that the request for reading clipboard information is a request for reading clipboard information that is not triggered by the user in the following manner: when the request for reading clipboard information is triggered by a non-user-specific program call stack, determining that the request for reading clipboard information is a request for reading clipboard information that is not triggered by the user.

In some embodiments, the apparatus for reading and writing clipboard information further comprises: a display unit, configured to run and display a corresponding application display interface after the first application reads the clipboard information.

According to a third aspect of embodiments of the present disclosure, there is provided an apparatus for reading and writing clipboard information, comprising a storage, configured to store instructions; and a processor, configured to invoke the instructions stored in the storage to execute any one of the foregoing methods for reading and writing clipboard information.

According to a fourth aspect of embodiments of the present disclosure, there is provided a computer-readable storage medium having stored therein instructions that, when executed by a processor, executes any one of the foregoing methods for reading and writing clipboard information.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this description, illustrate embodiments consistent with the present disclosure and, together with the description, serve to explain the principles of the present disclosure.

DETAILED DESCRIPTION

Description will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Typically, only one clipboard is arranged in the terminal operating system, and any application in the terminal can read the clipboard information in the clipboard and write the clipboard information into the behavior record of the application.

When the terminal obtains a request for reading and writing clipboard information sent by the application, the application will be directly allowed to read the clipboard information in the clipboard, and the read clipboard information is written into the behavior record of sending request, such that the application can directly and quickly acquire the clipboard information in the clipboard. However, when the clipboard information in the clipboard is private information, since each application can directly acquire the clipboard information, it is easy to cause the application to maliciously steal user information, which will bring losses and adverse effects to users, and reduce user experience.

Various embodiments of the present disclosure provide a method for reading and writing clipboard information, which can separate the read and write permission of the clipboard, and divide the read and write permission of the clipboard into the read permission and the write permission. Furthermore, when the terminal obtains the request for reading clipboard information sent by the application, it executes the read permission, and determines whether to allow or refuse to read the clipboard information based on the read permission. When the terminal obtains the request for writing clipboard information sent by the application, it executes the write permission, and determines whether to allow or refuse to write the clipboard information based on the write permission. The read and write permission of the clipboard is separated, such that the clipboard information cannot be directly acquired, thereby contributing to protect the security of the clipboard information, reducing the possibility of the leakage of the clipboard information, and contributing to improve the user experience.

In an example, the types of terminals may include mobile terminals, for example, mobile phones, tablets, notebooks, and the like. In another example, the structure of the terminal may include a double-sided screen terminal, a folding screen terminal, a full-screen terminal, and the like.

Figure 1:
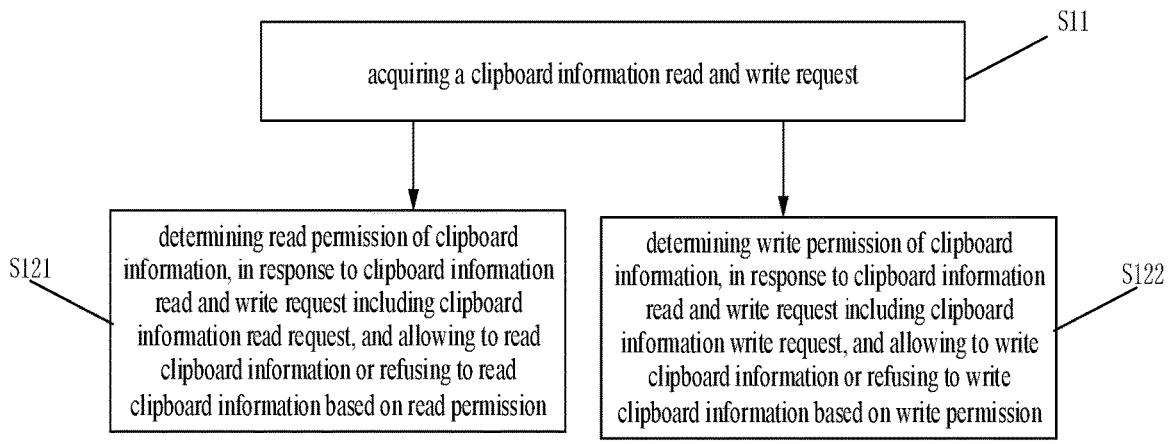
FIG. 1 is a flowchart showing a method for reading and writing clipboard information according to some embodiments.

FIG. 1 is a flowchart showing a method for reading and writing clipboard information according to some embodiments. As shown in FIG. 1, the method for reading and writing clipboard information is applied in a terminal and comprises the following steps S11 to S122.

In step S11, a request for reading and writing clipboard information is acquired.

In some embodiments of the present disclosure, in order to facilitate users to manage privacy permissions more flexibly, the permission status supported by the clipboard is divided into independent read permission and write permission, thereby avoiding the leakage of user's private information due to the application maliciously reading the clipboard information that is temporarily stored by the user in the clipboard and directly writing the clipboard information into the behavior recording function of the application. In an example, the private information may include the user's identity information, for example, identity information such as an ID card number and a mobile phone number. In another example, the private information may include some confidential information related to trade secrets.

In some embodiments of the present disclosure, the request for reading and writing clipboard information may be sent by any application in the terminal, and is used to apply to the terminal to access the clipboard, so as to read the clipboard information in the clipboard or write the clipboard information into the clipboard. If the application has a requirement to read the clipboard information in the clipboard, a request for reading clipboard information may be sent to the terminal, such that the terminal responds and determines that the permission status supported by the clipboard is the read permission. If the application has a requirement to write clipboard information in the clipboard, a request for writing clipboard information can be sent to the terminal, such that the terminal responds and determines that the permission status supported by the clipboard is the write permission. According to the request for reading and writing clipboard information sent by the application, the terminal clarifies the permission status supported by the clipboard, and then determines the permission status of the clipboard as the read permission or the write permission, so as to allow or refuse the request for reading and writing clipboard information sent by the application and protect the security of clipboard information.

In step S121, in response to the request for reading and writing clipboard information including a request for reading clipboard information, a read permission for clipboard information is determined, and the clipboard information is allowed to be read or the clipboard information is refused to be read, based on the read permission.

In some embodiments of the present disclosure, in order to protect the privacy of the user and avoid the leakage of the private information after the application reads the clipboard information temporarily stored by the user in the clipboard, the read permission of the clipboard can be set to allow to read the clipboard information or refuse to read the clipboard information when setting the read permission of the clipboard. The terminal responses according to the obtained request for reading and writing clipboard information, and when it is determined that the application needs to read the clipboard information in the clipboard, the terminal determines that the permission status supported by the clipboard is the read permission. Based on the setting of the read permission, the application is allowed to read the clipboard information or is refused to read the clipboard information. In an example, the setting of the read permission can be that it is set by the user in the terminal in advance, the read permission involved in each application in the terminal can be set uniformly, or the read permission can be set differently according to different applications. In another example, the setting of the read permission may be the default setting of the terminal.

In step S122, in response to the request for reading and writing clipboard information including a request for writing clipboard information, a write permission for the clipboard information is determined, and the clipboard information is allowed to be written or the clipboard information is refused to be written based on the write permission.

In some embodiments of the present disclosure, in order to prevent the user from accidentally triggering the clipboard when using the application, which affects the user experience, when setting the write permission of the clipboard, the write permission can be set to allow writing the clipboard information or refuse to write the clipboard information. The terminal responses according to the obtained request for reading and writing clipboard information, and when it is determined that the clipboard information in the clipboard needs to be written into the application, the terminal determines that the permission status supported by the clipboard is the write permission. Based on the setting of the write permission, the application is allowed to write the clipboard information, or the application is refused to write the clipboard information. In an example, the setting of the write permission can be that it is set by the user in the terminal in advance, the write permission involved in each application in the terminal can be set uniformly, or the write permission can be set differently according to different applications. In another example, the setting of the write permission may be the default setting of the terminal.

Through the above embodiments, the read and write permission of the clipboard are separated, such that the permission status of the clipboard can include the read permission and the write permission. In this way, the user can more flexibly control the settings of privacy permissions, thereby contributing to prevent the clipboard information of the clipboard from being maliciously acquired by the application and resulting in the leakage of private information. In addition, based on the permission status of the clipboard being set separately, the permission supported by the clipboard which is required by the application is allowed and refused, which contributes to prevent the application from performing useless information processing and resulting in waste of power consumption, and thus contributes to save power consumption.

In some embodiments, the read permission of the clipboard can be set to allow reading by default, such that the application can quickly read the clipboard information in the clipboard based on the sent request for reading clipboard information, and then perform corresponding processing on the read clipboard information to meet the user demands. In an implementation scenario, if the application that sends the request for reading clipboard information is an application trusted by the user, there is no need for the user to set the read permission of the clipboard to be allowing reading, which saves the user's setting operations and contributes to improve the user experience. In another implementation scenario, if the application that sends the request for reading clipboard information is an application that the user does not trust, in order to protect the security of the clipboard information, the default setting can be changed to prevent the leakage of user information. In yet another implementation scenario, if the user is not sure whether to trust the application that sends the request for reading clipboard information, the read permission of the clipboard can be determined as the default setting which allows to read the clipboard information, such that the application can be used normally when the user requires the application to read the clipboard information. After a period of time, when it is determined that the application is an application that the user does not trust, the read permission of the clipboard is changed, and is set to be refusing to read the clipboard information to ensure the security of the clipboard information, such that the user can flexibly change the read permission according to his/her own needs, thereby improving the user experience.

In some embodiments, the write permission for the clipboard information is determined based on whether the clipboard function is executed. If the clipboard function is in the executed state, it means that the user needs to use the clipboard, and the write permission for the clipboard information is determined as allowing writing such that the user can use the clipboard normally. In an example, "allowing to write clipboard information in a state that the clipboard function is executed" can be set as the default setting of the write permission, such that the user can smoothly write the clipboard information into the clipboard when the terminal executes the clipboard function.

For ease of understanding, the following embodiments will take a first application as an example to specifically determine the permission process of the first application to read the clipboard information. Herein, the first application may be any application in the terminal, which is not limited in this disclosure.

In some embodiments, the read permission for the first application to read the clipboard information can be determined when the request for reading clipboard information is sent by the first application. That is, the terminal clarifies that the first application has a requirement to read the clipboard information, based on the request for reading clipboard information for reading the clipboard information, sent by the first application, and then determines the read permission for the clipboard information based on the requirement of the first application to read the clipboard information.

In some embodiments, the read permission for the first application to read the clipboard information can be determined based on the content format of the clipboard information and the content format of the clipboard information to be read by the first application. The latest content format of the clipboard information is matched with the content format of the clipboard information to be read by the first application, and it is determined whether the first application can read the clipboard information normally. If the content format of the clipboard information matches the content format of the clipboard information to be read by the first application, it means that the first application can read the clipboard information normally, and it can be determined that the first application has the read permission to read the clipboard information. If the content format of the clipboard information does not match the content format of the clipboard information to be read by the first application, it means that the first application cannot read the clipboard information normally, and it is determined that the first application does not have the read permission to read the clipboard information.

In an example, the content format of the clipboard information to be read by the first application can be determined according to a content format standard specified by a third party. Herein, the third party may be the developer of the first application. Through the content format standard specified by the third party, the content format that can be read by the first application can be accurately known, and then, when it is determined that the content format of the clipboard information matches the content format of the clipboard information to be read by the first application, it can be determined that the clipboard information is the information that can be read by the first application, and the first application can perform corresponding processing according to the read clipboard information. In another example, the content format standard specified by the third party may be provided by the third party. In yet another example, the content format standard specified by the third party may be formed by decompiling based on the information that can be recognized by the first application.

Based on a similar concept, the embodiments of the present disclosure further provide another method for reading and writing clipboard information applied to a terminal.

Figure 2:
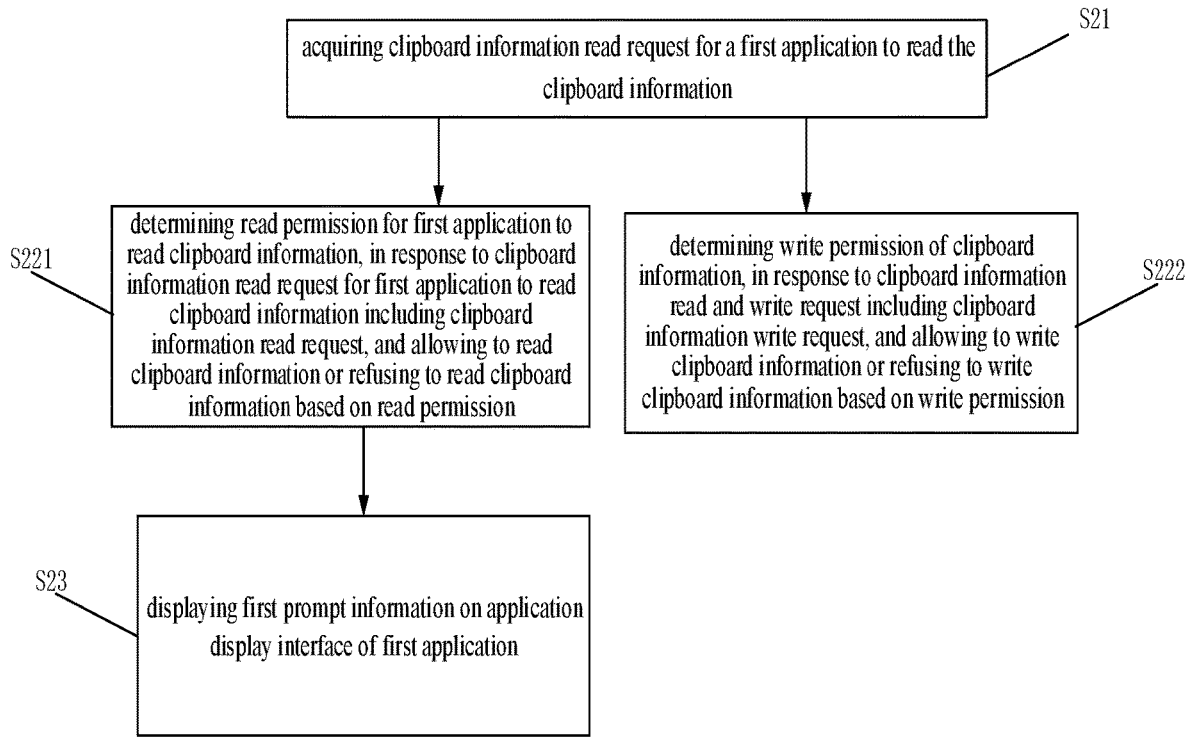
FIG. 2 is a flowchart showing another method for reading and writing clipboard information according to some embodiments.

FIG. 2 is a flowchart showing a method for reading and writing clipboard information according to some embodiments, and as shown in FIG. 2, the method for reading and writing clipboard information is applied in a terminal and comprises the following steps S21 to S23.

In step S21, a request for reading clipboard information for a first application to read the clipboard information is acquired.

In step S221, in response to the request for reading clipboard information for the first application to read the clipboard information including a request for reading clipboard information, a read permission for the first application to read the clipboard information is determined, and the clipboard information is allowed to be read or the clipboard information is refused to be read based on the read permission.

In step S23, the first prompt information is displayed on the application display interface of the first application.

In some embodiments of the present disclosure, in the application display interface of the first application, the first prompt information is displayed to inform the user that the first application has a behavior of reading the clipboard information. Herein, the first prompt information is used to prompt that the first application is allowed to read the clipboard information or the first application is refused to read the clipboard information. The content of the first prompt information may include: that the first application has been allowed to read the clipboard information or that the first application has been refused to read the clipboard information. Through the first prompt information, the user can clearly and intuitively understand that the first application has the intention of reading the clipboard information, and can quickly determine the situation where the first application reads the clipboard information. In an example, the user can also correspondingly set the read and write permission for the reading of the clipboard information according to the first prompt information displayed, such that the corresponding read and write permission of the first application can meet the user's usage requirements, and in this way, the user control for the permission status supported by the clipboard is more flexible and more targeted.

Figure 3:
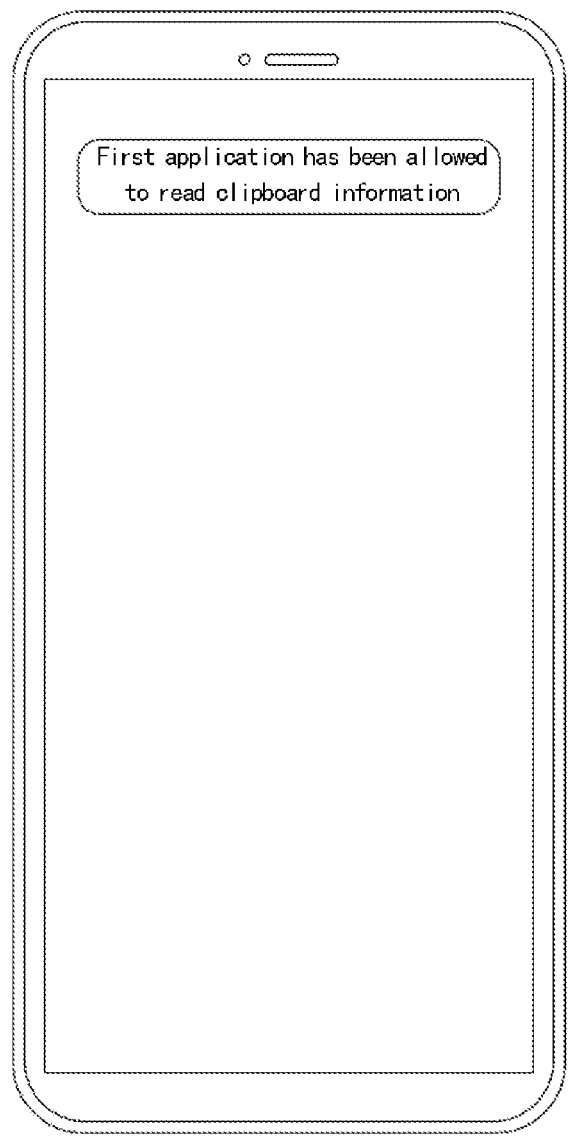
FIG. 3 is a schematic diagram showing display information according to some embodiments.
Figure 4:
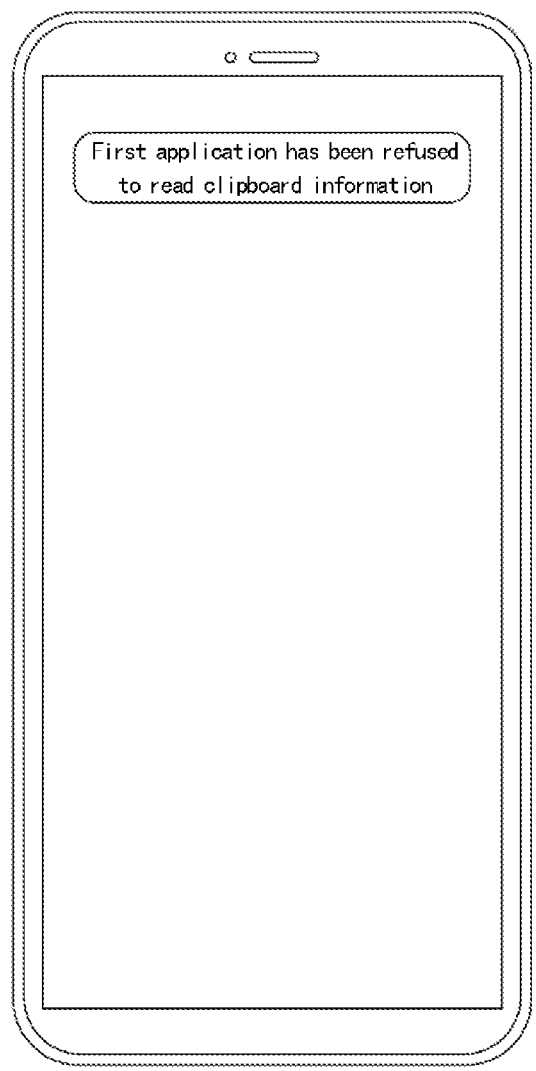
FIG. 4 is a schematic diagram showing another display information according to some embodiments.

In an implementation scenario, as shown in FIG. 3 and FIG. 4, the first prompt information may be on the top of the terminal, and prompts the user in a manner of prompt bubbles. The content of the first prompt information may include: that the first application has been allowed to read the clipboard information or that the first application has been refused to read the clipboard information. FIG. 3 and FIG. 4 are schematic diagrams of display information provided according to some embodiments.

In step S222, in response to the request for reading and writing clipboard information including a request for writing clipboard information, a write permission for the clipboard information is determined, and the clipboard information is allowed to be written or the clipboard information is refused to be written based on the write permission.

In the foregoing embodiments, through the first prompt information displayed on the application display interface of the first application, the user can clearly and intuitively understand that the first application has the intention of reading the clipboard information, and can quickly determine the situation where the first application reads the clipboard information, thereby increasing the user's sensitivity to the application to read the clipboard information, which contributes to enhance the user's security awareness of managing the private information.

In some embodiments, in order for the user to be able to make it clear that the first application has been refused to read the clipboard information by the terminal, and to avoid frequent display of the first prompt information affecting the user's normal use of the first application, a first number threshold is predetermined. Herein, the first number threshold is used to determine whether to display the prompt information indicating that the first application is refused to read the clipboard information. If the number of times that the first application is refused to read the clipboard information by the terminal reaches the first number threshold, the first prompt information indicating that the first application is refused to read the clipboard information is displayed. If the number of times that the first application is refused to read the clipboard information by the terminal does not reach the first number threshold, the first prompt information indicating that the first application is refused to read the clipboard information is not displayed. The first number threshold may be multiple number thresholds. In an implementation scenario, the predetermined first number thresholds may be 1, 10, 20 and 30. In the case that the first application is refused for the 1st, 10th, 20th or 30th time to read the clipboard information, the first prompt information is displayed. In other cases, the first prompt information is not displayed.

In an example, the number of times that the first application is refused to read the clipboard information may be a count of the number of times that the first application is refused to read the clipboard information within a specified time period. For example, within 24 hours, the number of times that the first application is refused to read the clipboard information is counted. In another example, the number of times that the prompt information indicating that the first application is refused to read the clipboard information is displayed can be determined based on the monitoring of the terminal system.

In some embodiments, for the first prompt information displayed on the application display interface of the first application, after the display time reaches the predetermined time, the first prompt information can be hidden automatically. Herein, the first prompt information may include a prompt that the first application is allowed to read the clipboard information or that the first application is refused to read the clipboard information. In this way, the user does not need to actively close the prompt information, which saves the user operation and contributes to improve the user experience. In an example, a toast prompt box can be used to display the first prompt information. The toast is a prompt box that can be displayed without affecting the interaction between the user and the terminal, and can automatically disappear within a specified time.

In some embodiments, for the first prompt information displayed after the number of times that the first application is refused to read the clipboard information reaches the first number threshold, after the display time reaches the predetermined time, the first prompt information can be hidden automatically, such that the application display interface of the first application no longer continues displaying the first prompt information, thereby saving user operations. Also, it is contributive for the user to make it clear that the first application has a behavior of reading the clipboard information, and at the same time, the interference of the first prompt information to the user using the first application is reduced, thereby improving the user experience. In an implementation scenario, the display time of the first prompt information is set to 2 seconds. When the display time of the first prompt information indicating that the first application is refused to read the clipboard information reaches 2 seconds, the first prompt information is hidden automatically.

In some embodiments, when the first application frequently sends a read request to read the clipboard information to the terminal, in order to arouse the user's alertness, it is informed that the application always has a requirement to read the clipboard information, and when the number of times that the first application is refused to read the clipboard information by the terminal reaches the second number threshold, the first prompt information including the selection control is displayed. The content of the selection control may include: no longer reminding or reminding again. The second number threshold may be multiple number thresholds. Herein, the first prompt information is used to indicate that the first application is refused to read the clipboard information. In addition, through the selection control in the first prompt information, the user can independently select whether the terminal displays the first prompt information indicating that the first application is refused to read the clipboard information again. Based on the selection control triggered by the user, it is determined whether to continue or stop displaying the first prompt information. That is, the terminal determines to continue displaying the first prompt information or not to continue displaying the first prompt information according to the selection control triggered by the user. In an example, the displayed first prompt information may also include the content of the clipboard information that is refused to be read by the first application. Through the displayed content of the clipboard information, the user can make it clear that the first application frequently requests the information that needs to be read. In another example, the first prompt information may be at the bottom of the terminal or in the middle of the terminal.

Figure 5:
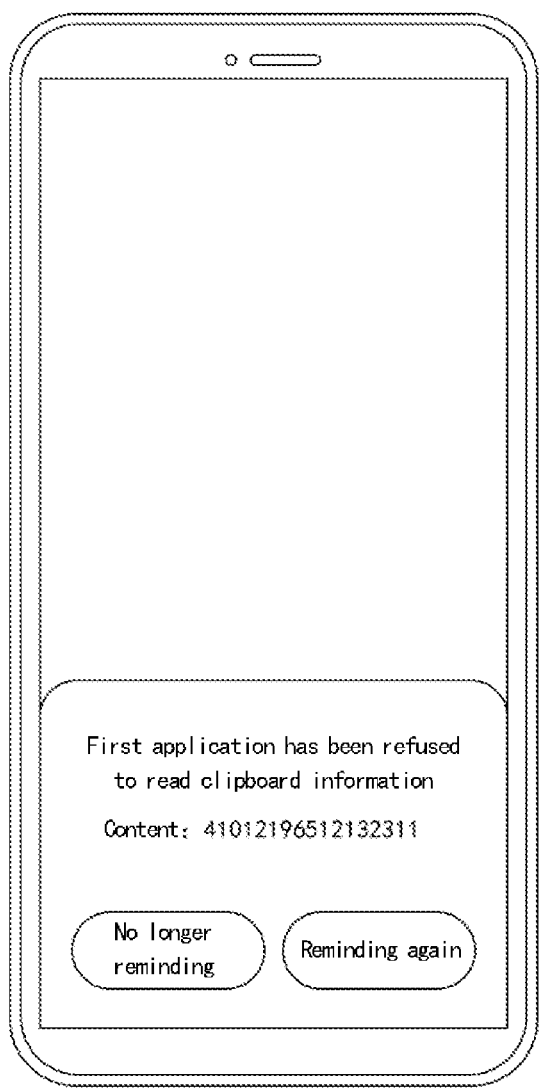
FIG. 5 is a schematic diagram showing yet another display information according to some embodiments.

In an implementation scenario, as shown in FIG. 5. FIG. 5 is a schematic diagram of display information provided according to an embodiment. The predetermined second number thresholds are 1, 100, and 200. When the first application is refused for the 1st, 100th and 200th time to read the clipboard information, the first prompt information including the contents of the selection control and the clipboard information is displayed. Herein, the content of the clipboard information is: 41012196512132311. The content of the selection control may include: no longer reminding or reminding again. If the selection control touched and controlled by the user is no longer reminding, the first prompt information will no longer be displayed. If the selection control touched and controlled by the user is reminding again, the first prompt information is continued to be displayed.

In some embodiments, the first prompt information indicating that the first application is refused to read the clipboard information for the first time is displayed by default.

In some embodiments, the request for reading clipboard information may be triggered autonomously by the first application, or may be triggered based on a user operation. For example, the autonomous triggering of the first application may be the reading of clipboard information based on application requirements during the running process of the first application, wherein the information in the clipboard is not generated by being triggering by a user operation. Based on the triggering by a user operation, it can be understood that the information in the clipboard is obtained by the user's autonomous operation. For example, it may be that the user has copied a piece of text information and written it into the clipboard, and subsequently, the user pastes the copied text information in the first application, which can be understood as that a user operation triggers the first application to read the clipboard information.

In some embodiments of the present disclosure, before displaying the first prompt information, it is determined that whether the sending of the request for reading clipboard information of the first application to the terminal is triggered by the user or is triggered by the first application (not triggered by the user), thereby determining whether to display the first prompt information.

In an example, if the request for reading clipboard information is autonomously triggered by the first application, it means that the behavior of the first application to send the request for reading clipboard information to the terminal belongs to a private behavior of the first application, and the user is not aware of it. If the request for reading clipboard information is autonomously triggered by the first application, in order to improve the security of reading the clipboard information and prevent the leakage of the user's private information, the first prompt information is displayed on the application display interface of the first application to inform the user that the first application has the behavior of acquiring the clipboard information.

In another example, if the request for reading clipboard information is triggered by the user, it means that the user is aware of the behavior of the first application to acquire the clipboard information, the first prompt information is not displayed on the application display interface of the first application, thereby contributing to save power consumption.

Figure 6:
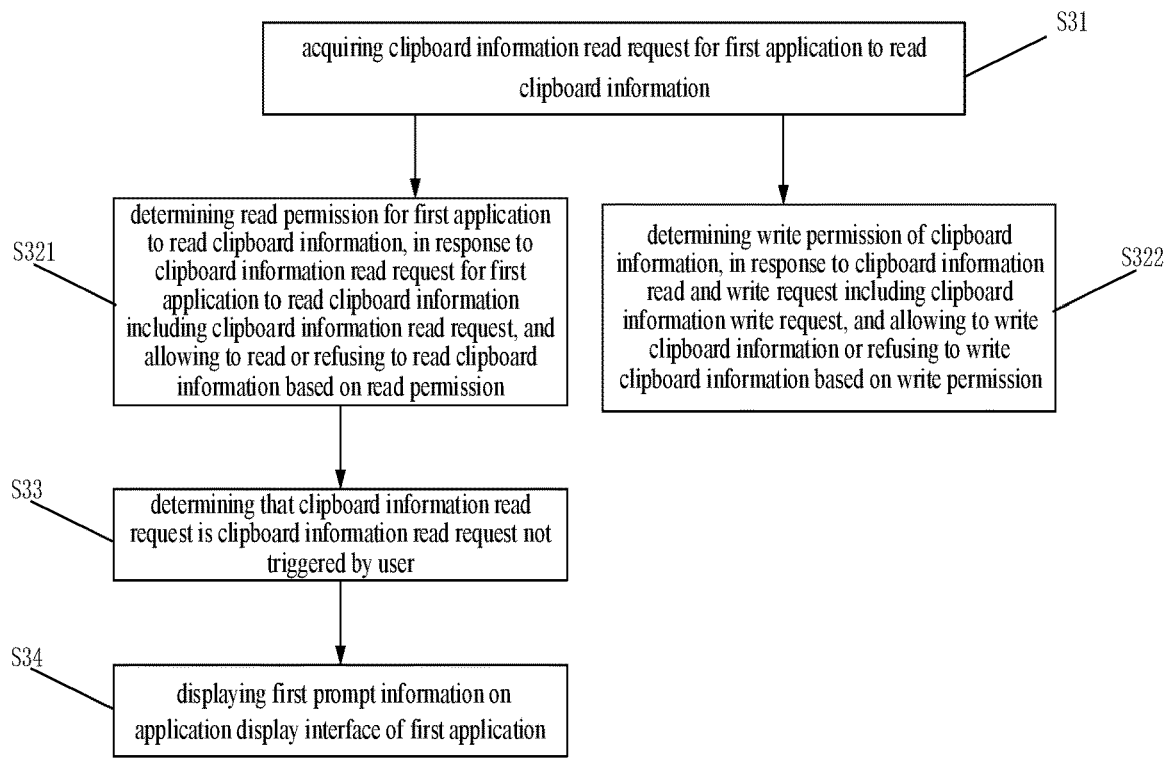
FIG. 6 is a flowchart showing yet another method for reading and writing clipboard information according to some embodiments.

FIG. 6 is a flowchart showing a method for reading and writing clipboard information according to some embodiments, and as shown in FIG. 6, the method for reading and writing clipboard information is applied in a terminal and comprises the following steps S31 to S34.

In step S31, a request for reading clipboard information for the first application to read the clipboard information is acquired.

In step S321, in response to the request for reading clipboard information for the first application to read the clipboard information including a request for reading clipboard information, a read permission for the first application to read the clipboard information is determined, and the clipboard information is allowed to be read or the clipboard information is refused to be read based on the read permission.

In step S33, it is determined that the request for reading clipboard information is a request for reading clipboard information that is not triggered by the user.

In some embodiments of the present disclosure, in order to protect the security of the clipboard information and prevent the leakage of the user's private information, the trigger that triggers the first application to send the request for reading clipboard information is determined based on the acquired request for reading clipboard information. When the request for reading clipboard information is determined as the request for reading clipboard information that is not triggered by the user, it is determined to inform the user, by displaying the first prompt information, that the first application has the behavior of acquiring the clipboard information privately to improve the sensitivity of the user to the management of the private information.

In step S34, the first prompt information is displayed on the application display interface of the first application.

In step S322, in response to the request for reading and writing clipboard information including a request for writing clipboard information, a write permission for the clipboard information is determined, and the clipboard information is allowed to be written or the clipboard information is refused to be written based on the write permission.

In an implementation scenario, if the user actively triggers the first application to execute the function of reading the clipboard information in the first application, then in the application display interface of the first application, the first prompt information which has the display content of "the first application has been allowed to read the clipboard information" may not appear. If the first application autonomously triggers the first application to execute the function of reading the clipboard information, the information for indicating that the first application is allowed to read the clipboard information or that the first application is refused to read the clipboard information is displayed on the application display interface of the first application to inform the user that the first application has the behavior of acquiring the clipboard information privately.

In some embodiments, it can be determined based on the program call stack that the request for reading clipboard information is triggered autonomously by the first application, or triggered based on the user operation. Herein, the program call stack may include a user-specific program call stack and a non-user-specific program call stack. If the reading of the clipboard information is triggered by the user operation, based on the user operation in the first application, the user-specific program call stack is triggered to send the request for reading clipboard information to the clipboard.

When there is no user trigger in the first application, and it is autonomously triggered by the first application, that is, it is not triggered by the user, the first application triggers the non-user-specific program call stack to send the request for reading clipboard information to the terminal. In view of this, according to the trigger of the request for reading clipboard information being a non-user-specific program call stack, the terminal can determine that the request for reading clipboard information is triggered privately by the first application, rather than the user has a requirement to read the clipboard information.

Based on the similar concept, the embodiments of the present disclosure also provide yet another method for reading and writing clipboard information applied to a terminal.

Figure 7:
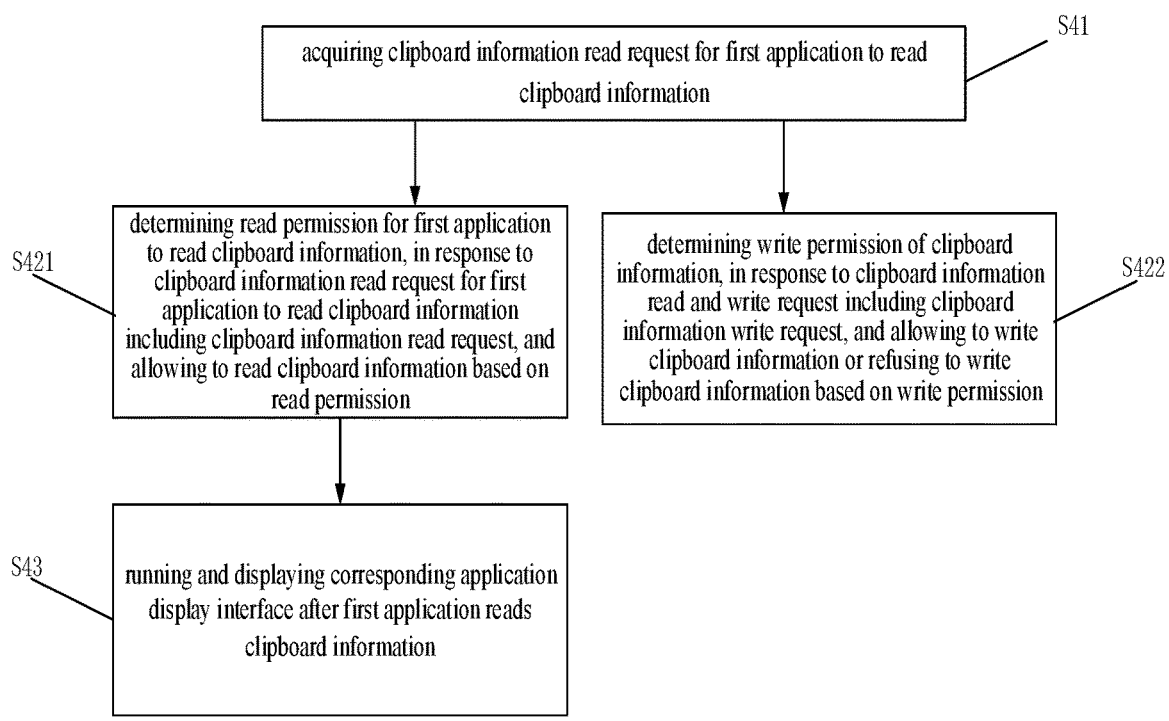
FIG. 7 is a flowchart showing yet another method for reading and writing clipboard information according to some embodiments.

FIG. 7 is a flowchart showing a method for reading and writing clipboard information according to some embodiments, and as shown in FIG. 7, the method for reading and writing clipboard information is applied in a terminal and comprises the following steps S41 to S43.

In step S41, a request for reading clipboard information for the first application to read the clipboard information is acquired.

In step S421, in response to the request for reading clipboard information for the first application to read the clipboard information including a request for reading clipboard information, a read permission for the first application to read the clipboard information is determined, and the clipboard information is allowed to be read based on the read permission.

In step S43, a corresponding application display interface is run and displayed after the first application reads the clipboard information.

In some embodiments of the present disclosure, after the terminal determines that the first application can be allowed to read the clipboard information, the first application reads the clipboard information to obtain the content of the clipboard information. The first application runs the obtained clipboard information and displays it on the corresponding application display interface after the first application reads the clipboard information, such that the user can intuitively and clearly know that the first application has read and run the clipboard information.

Figure 8:
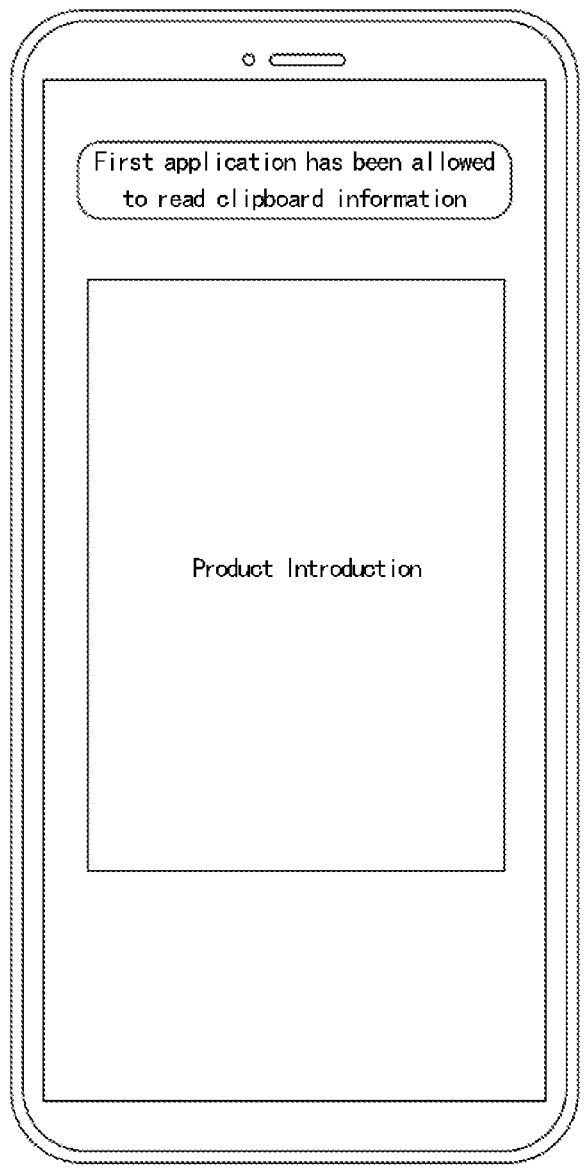
FIG. 8 is a schematic diagram showing yet another display information according to some embodiments.

In a real-time scenario, as shown in FIG. 8, if the clipboard information is a production link that can be read by the first application, running and displaying the corresponding application display interface after the first application reads the clipboard information may include: invoking the corresponding product introduction of the product link in the first application, and displaying the product introduction in the current application display interface of the first application. FIG. 8 is a schematic diagram of display information provided according to an embodiment. Alternatively, running and displaying the corresponding application display interface after the first application reads the clipboard information may include: determining the position of the product link in the first application, and then jumping the current application display interface of the first application to the application display interface of the product link in the first application, and displaying the product corresponding to the product link.

In step S422, in response to the request for reading and writing clipboard information including a request for writing clipboard information, a write permission for the clipboard information is determined, and the clipboard information is allowed to be written or the clipboard information is refused to be written based on the write permission.

In some embodiments, if the first application has been allowed to read the clipboard information or allowed to write clipboard information, it is recorded in the behavior recording function of the first application to clarify the behavior of the first application.

In an implementation scenario, the permission status of the clipboard function in the mobile phone regarding the read and write permission is divided into the read permission and the write permission. The read permission is set by default to allow reading of the clipboard information, and the write permission is set by default to allow writing of the clipboard information when the clipboard function is executed. When the first application sends a request for reading and writing clipboard information to the mobile phone, if the content format of the clipboard information matches the content format of the clipboard information to be read by the first application, it is determined and allowed that the first application has a read permission to read the clipboard information. The first prompt information is displayed in the form of prompt bubbles to inform the user that the first application has been allowed to read the clipboard information, at the top of the mobile phone. The displayed first application interface may be a corresponding application display interface after the first application runs the clipboard information. If the latest content format of the clipboard information does not match the content format of the clipboard information to be read by the first application, it is determined that the first application does not have the read permission to read the clipboard information, and the first application is refused to read the clipboard information.

When the first application is refused for the 10th, 20th, 30th . . . time on the same day, a toast prompt box will pop up to notify the user that the first application has been refused to read the clipboard information. When the first application is refused for the 1st, 100th, 200th time on the same day, the first prompt information including the selection control and the contents of the clipboard information is displayed. The user can determine that the terminal continues displaying the first prompt information or does not continue displaying the first prompt information through the triggered selection control. If the first application has been allowed to read the clipboard information or allowed to write the clipboard information, it is recorded in the behavior recording function of the first application to clarify the behavior of the first application.

Based on the similar concept, the embodiments of the present disclosure also provide an apparatus for reading and writing clipboard information, which is applied to a terminal.

It can be understood that, in order to implement the above functions, the apparatus for reading and writing clipboard information provided by the embodiments of the present disclosure includes a corresponding hardware structure and/or software module for executing each function. In combination with the units and algorithm steps of the respective examples disclosed in some embodiments of the present disclosure, the embodiments of the present disclosure can be implemented in the form of hardware or a combination of hardware and computer software. Whether a function is executed by the hardware or a method of driving the hardware by the computer software depends on the specific application and design constraints of the technical solution. A person skilled in the art may use different methods to implement the described functions for each specific application, but such implementation should not be considered to exceed the scope of the technical solutions of the embodiments of the present disclosure.

Figure 9:
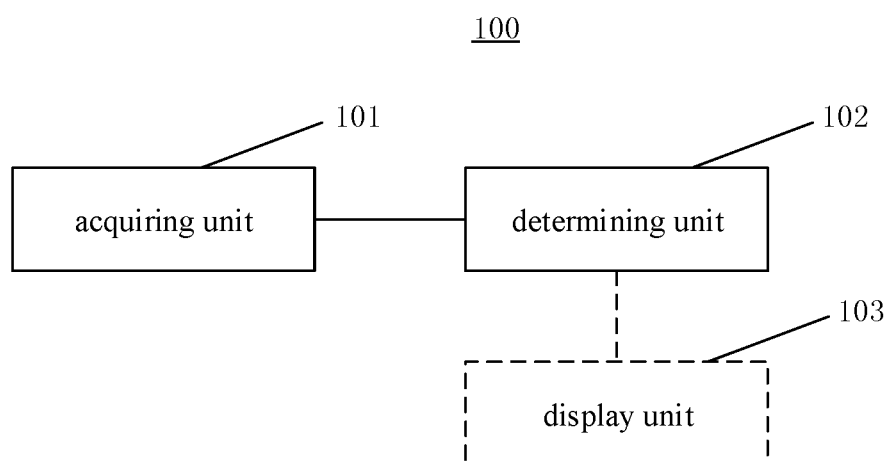
FIG. 9 is a block diagram showing an apparatus for reading and writing clipboard information according to some embodiments.

FIG. 9 is a block diagram showing an apparatus for reading and writing clipboard information according to some embodiments. Referring to FIG. 9, the apparatus 100 for reading and writing clipboard information includes an acquiring unit 101 and a determining unit 102.

The acquiring unit 101 is configured to acquire a request for reading and writing clipboard information.

The determining unit 102 is configured to, in response to the request for reading and writing clipboard information including a request for reading clipboard information, determine a read permission for clipboard information, and allow to read the clipboard information or refuse to read the clipboard information based on the read permission.

The determining unit 102 is further configured to, in response to the request for reading and writing clipboard information including a request for writing clipboard information, determine a write permission for the clipboard information, and allow to write the clipboard information or refuse to write the clipboard information based on the write permission.

In some embodiments, the determining unit 102 determines the read permission for the clipboard information in the following manner: determining that reading a permission set by default for the read permission for the clipboard information is allowed.

In some embodiments, the determining unit 102 determines the write permission for the clipboard information in the following manner: in response to a clipboard function being executed, determining that the write permission for the clipboard information is to allow writing.

In some embodiments, the request for reading clipboard information is a request for reading clipboard information for a first application to read the clipboard information. The determining unit 102 determines the read permission for the clipboard information in the following manner: determining the read permission for the first application to read the clipboard information.

In some embodiments, the determining unit 102 determines the read permission for the first application to read the clipboard information in the following manner: when a content format of the clipboard information matches a content format of the clipboard information to be read by the first application, determining that the first application has the read permission to read the clipboard information; and when the content format of the clipboard information does not match the content format of the clipboard information to be read by the first application, determining that the first application does not have the read permission to read the clipboard information.

In some embodiments, after allowing to read the clipboard information or refusing to read the clipboard information, the apparatus 100 for reading and writing clipboard information further comprises: a display unit 103, configured to display first prompt information on an application display interface of the first application, the first prompt information being used to prompt that the first application is allowed to read the clipboard information or that the first application is refused to read the clipboard information.

In some embodiments, the display unit 103 displays the first prompt information on the application display interface of the first application in the following manner: in response to the first application being refused to read the clipboard information and the number of times the first application is refused to read the clipboard information reaching a first number threshold, displaying the first prompt information for indicating that the first application is refused to read the clipboard information, and hiding the first prompt information after a predetermined time is reached.

In some embodiments, the display unit 103 displays the first prompt information on the application display interface of the first application in the following manner: in response to the first application being refused to read the clipboard information and the number of times the first application is refused to read the clipboard information reaching a second number threshold, displaying the first prompt information for indicating that the first application is refused to read the clipboard information, the first prompt information including a selection control for a user to determine whether to display the first prompt information again; and based on the selection control triggered by the user, continuing or stopping displaying the first prompt information.

In some embodiments, the determining unit 102 is further configured to: determine that the request for reading clipboard information is a request for reading clipboard information that is not triggered by the user.

In some embodiments, the determining unit 102 determines that the request for reading clipboard information is a request for reading clipboard information that is not triggered by the user in the following manner: when the request for reading clipboard information is triggered by a non-user-specific program call stack, determining that the request for reading clipboard information is a request for reading clipboard information that is not triggered by the user.

In some embodiments, after allowing to read the clipboard information, the display unit 103 is further configured to: run and display a corresponding application display interface after the first application reads the clipboard information.

With respect to the apparatuses in the above embodiments, the specific manners for performing operations for individual modules therein have been described in detail in the embodiments regarding the methods, which will not be elaborated herein.

Figure 10:
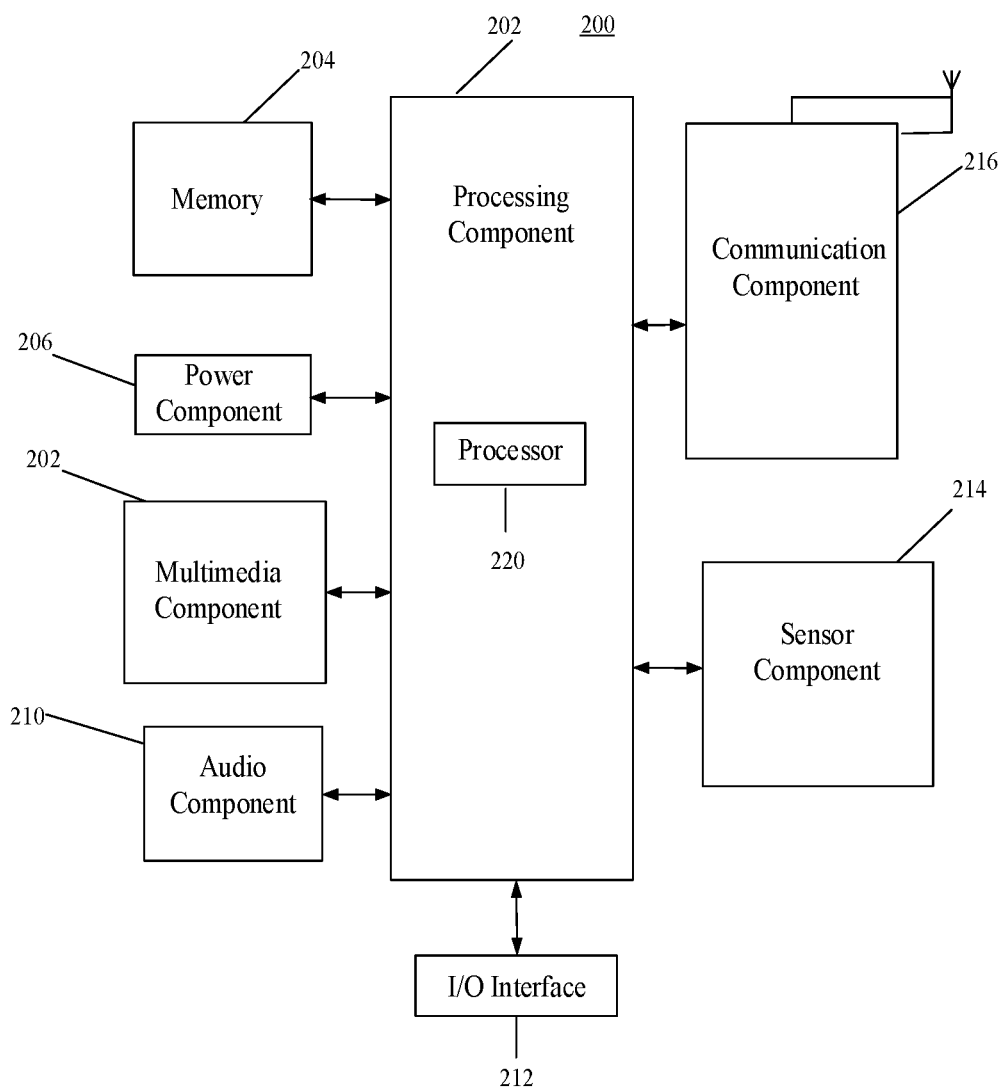
FIG. 10 is a block diagram showing an apparatus for reading and writing clipboard information according to some embodiments.

FIG. 10 is a block diagram showing an apparatus 200 for reading and writing clipboard information according to some embodiments. For example, the apparatus 200 for reading and writing clipboard information can be a mobile phone, a computer, a digital broadcast terminal, a messaging device, a gaming console, a tablet, a medical device, exercise equipment, a personal digital assistant, and the like.

Referring to FIG. 10, the apparatus 200 for reading and writing clipboard information may include one or more of the following components: a processing component 202, a memory 204, a power component 206, a multimedia component 208, an audio component 210, an input/output (I/O) interface 212, a sensor component 214, and a communication component 216.

The processing component 202 typically controls overall operations of the apparatus 200 for reading and writing clipboard information, such as the operations associated with display, telephone calls, data communications, camera operations, and recording operations. The processing component 202 may include one or more processors 220 to execute instructions to implement all or part of the steps in the above described methods. Moreover, the processing component 202 may include one or more modules which facilitate the interaction between the processing component 202 and other components. For instance, the processing component 202 may include a multimedia module to facilitate the interaction between the multimedia component 208 and the processing component 202.

The memory 204 is configured to store various types of data to support the operation of the apparatus 200 for reading and writing clipboard information. Examples of such data include instructions for any applications or methods operated on the apparatus 200 for reading and writing clipboard information, contact data, phonebook data, messages, pictures, videos, etc. The memory 204 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 206 supplies power to various components of the apparatus 200 for reading and writing clipboard information. The power component 206 may include a power management system, one or more power sources, and other components associated with the generation, management, and distribution of power in the apparatus 200 for reading and writing clipboard information.

The multimedia component 208 includes a screen providing an output interface between the apparatus 200 for reading and writing clipboard information and a user. In some embodiments, the screen may include a liquid crystal display (LCD) and a touch panel (TP). In some implementations, an organic light-emitting diode can be employed.

If the screen includes the touch panel, the screen can be implemented as a touch screen to receive input signals from the user. The touch panel includes one or more touch sensors to sense touches, swipes, and gestures on the touch panel. The touch sensors can not only sense a boundary of a touch or swipe action, but also sense a period of time and a pressure associated with the touch or swipe action. In some embodiments, the multimedia component 208 includes a front camera and/or a rear camera. The front camera and/or the rear camera can receive external multimedia data while the apparatus 200 for reading and writing clipboard information is in an operation mode, such as a photographing mode or a video mode. Each of the front camera and the rear camera may be a fixed optical lens system or have focus and optical zoom capability.

The audio component 210 is configured to output and/or input audio signals. For example, the audio component 210 includes a microphone (MIC) configured to receive an external audio signal when the apparatus 200 for reading and writing clipboard information is in an operation mode, such as a call mode, a recording mode, and a voice recognition mode. The received audio signal can be further stored in the memory 204 or transmitted via the communication component 216. In some embodiments, the audio component 210 further includes a speaker to output audio signals.

The I/O interface 212 provides an interface between the processing component 202 and peripheral interface modules, such as a keyboard, a click wheel, buttons, and the like. The buttons may include, but are not limited to, a home button, a volume button, a starting button, and a locking button.

The sensor component 214 includes one or more sensors to provide status assessments of various aspects of the apparatus 200 for reading and writing clipboard information. For instance, the sensor component 214 can detect an on/off status of the apparatus 200 for reading and writing clipboard information, relative positioning of components, e.g., the display and a keypad, of the apparatus 200 for reading and writing clipboard information, the sensor component 214 can also detect a change in position of the apparatus 200 for reading and writing clipboard information or one component of the apparatus 200 for reading and writing clipboard information, a presence or absence of user contact with the apparatus 200 for reading and writing clipboard information, an orientation or an acceleration/deceleration of the apparatus 200 for reading and writing clipboard information, and a change in temperature of the apparatus 200 for reading and writing clipboard information. The sensor component 214 may include a proximity sensor configured to detect the presence of nearby objects without any physical contact. The sensor component 214 may also include a light sensor, such as a CMOS or CCD image sensor, for use in imaging applications. In some embodiments, the sensor component 214 can also include an accelerometer sensor, a gyroscope sensor, a magnetic sensor, a pressure sensor, or a temperature sensor.

The communication component 216 is configured to facilitate wired or wireless communication between the apparatus 200 for reading and writing clipboard information and other devices. The apparatus 200 for reading and writing clipboard information can access a wireless network based on a communication standard, such as Wi-Fi, 2G, 3G, 4G, or 5G, or a combination thereof. In one exemplary embodiment, the communication component 216 receives a broadcast signal or broadcast associated information from an external broadcast management system via a broadcast channel. In one exemplary embodiment, the communication component 216 further includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 200 for reading and writing clipboard information may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as the memory 204 including the instructions executable by the processor 220 in the apparatus 200 for reading and writing clipboard information, for completing the above described methods. For example, the non-transitory computer-readable storage medium can be a ROM, a random access memory (RAM), a CD-ROM, a magnetic tape, a floppy disc, an optical data storage device, and the like.

Various embodiments of the present disclosure can have one or more of the following advantages.

Through the method for reading and writing clipboard information provided by the present disclosure, the read and write permission of the clipboard can be divided into the read permission and the write permission to determine the permissions for the clipboard to respond and execute correspondingly according to the acquired request for reading and writing clipboard information, thereby contributing to prevent the leakage of the clipboard information in the clipboard, improving the security of the clipboard information, and improving the user experience.

It can be understood that the "multiple" in the disclosure means two or more, and other quantifiers are similar. "And/or" describes the relationship of the related objects, indicating that there may be three relationships, for example, A and/or B may indicate three cases: A exists alone, A and B exist simultaneously, and B exists alone. The character "/" generally indicates that the relationship between the contextually relevant objects is a "or" relationship. The singular forms "a," "an," and "the" are also intended to include the plural forms unless the context clearly indicates otherwise.

It can be further understood that although the terms such as "first" and "second" are used to describe various information, and such information should not be limited by these terms. The terms are only used to distinguish the same type of information from each other, and do not indicate a specific order or importance. In fact, the expressions such as "first" and "second" can be used interchangeably. For instance, first information can also be referred to as second information without departing from the scope of the disclosure, and similarly, the second information can also be referred to as the first information.

The various device components, units, circuits, blocks, or portions may have modular configurations, or are composed of discrete components, but nonetheless may be referred to as "modules," "components" or "circuits" in general. In other words, the components, units, circuits, blocks, or portions referred to herein may or may not be in modular forms.

The various device components, units, blocks, portions, or modules may be realized with hardware, software, or a combination of hardware and software.

In some embodiments of the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms In some embodiments of the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In some embodiments of the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or retracted from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

What is claimed is:

1. A method for reading and writing clipboard information, applied to a terminal, the method comprising:
    acquiring a request for reading and writing clipboard information;
    determining a read permission for the clipboard information, in response to the request for reading and writing clipboard information including a request for reading clipboard information, and allowing to read the clipboard information or refusing to read the clipboard information based on the read permission; and
    determining a write permission for the clipboard information, in response to the request for reading and writing clipboard information including a request for writing clipboard information, and allowing to write the clipboard information or refusing to write the clipboard information based on the write permission,
    wherein:
    the read permission and the write permission are set separately;
    the request for reading clipboard information is a request for reading clipboard information for a first application to read the clipboard information;
    the determining a read permission for clipboard information comprises:
    determining the read permission for the first application to read the clipboard information;
    after allowing to read the clipboard information or refusing to read the clipboard information, the method further comprises:
    displaying first prompt information on an application display interface of the first application, the first prompt information being used to prompt that the first application is allowed to read the clipboard information or that the first application is refused to read the clipboard information; and
    the displaying first prompt information on an application display interface of the first application comprises:
    displaying the first prompt information for indicating that the first application is refused to read the clipboard information, and automatically hiding the first prompt information after a predetermined time is reached, in response to the first application being refused to read the clipboard information and the number of times that the first application is refused to read the clipboard information reaching a first number threshold.

2. The method for reading and writing clipboard information according to claim 1, wherein the determining a read permission for clipboard information comprises:
    determining that reading a permission set by default for the read permission for the clipboard information is allowed.

3. The method for reading and writing clipboard information according to claim 1, wherein the determining a write permission for the clipboard information comprises:
    determining that the write permission for the clipboard information is to allow writing, in response to an execution of a clipboard function.

4. The method for reading and writing clipboard information according to claim 1, wherein the determining a read permission for the first application to read the clipboard information comprises:
    when a content format of the clipboard information matches a content format of the clipboard information read by the first application, determining that the first application has the read permission to read the clipboard information; and
    when the content format of the clipboard information does not match the content format of the clipboard information read by the first application, determining that the first application does not have the read permission to read the clipboard information.

5. The method for reading and writing clipboard information according to claim 1, wherein the displaying first prompt information on an application display interface of the first application comprises:
    displaying the first prompt information for indicating that the first application is refused to read the clipboard information, in response to the first application being refused to read the clipboard information and the number of times the first application is refused to read the clipboard information reaching a second number threshold, the first prompt information including a selection control for a user to determine whether to display the first prompt information again; and
    continuing or stopping displaying the first prompt information, based on the selection control triggered by the user.

6. The method for reading and writing clipboard information according to claim 1, wherein prior to the displaying the first prompt information on the application display interface of the first application, the method further comprises:
    determining that the request for reading clipboard information is a request for reading clipboard information that is not triggered by the user.

7. The method for reading and writing clipboard information according to claim 6, wherein the determining that the request for reading clipboard information is a request for reading clipboard information that is not triggered by the user comprises:
    when the request for reading clipboard information is triggered by a non-user-specific program call stack, determining that the request for reading clipboard information is a request for reading clipboard information that is not triggered by the user.

8. The method for reading and writing clipboard information according to claim 1, wherein after allowing to read the clipboard information, the method further comprises:

running and displaying a corresponding application display interface after the first application reads the clipboard information.

9. An apparatus for reading and writing clipboard information, applied to a terminal, the apparatus comprising:
a display circuit;
an acquiring circuit, configured to acquire a request for reading and writing clipboard information;
a determining circuit, configured to determine a read permission for clipboard information, in response to the request for reading and writing clipboard information including a request for reading clipboard information, and allow to read the clipboard information or refuse to read the clipboard information based on the read permission, and
the determining circuit is further configured to determine a write permission for the clipboard information, in response to the request for reading and writing clipboard information including a request for writing clipboard information, and allow to write the clipboard information or refuse to write the clipboard information based on the write permission,
wherein:
the read permission and the write permission are set separately;
the request for reading clipboard information is a request for reading clipboard information for a first application to read the clipboard information;
the determining circuit is configured to determine the read permission for the clipboard information by determining the read permission for the first application to read the clipboard information;
after allowing to read the clipboard information or refusing to read the clipboard information, the display circuit is configured to display first prompt information on an application display interface of the first application, the first prompt information being used to prompt that the first application is allowed to read the clipboard information or that the first application is refused to read the clipboard information; and
the display circuit is further configured to display the first prompt information on the application display interface of the first application by:
displaying the first prompt information for indicating that the first application is refused to read the clipboard information, and automatically hiding the first prompt information after a predetermined time is reached, in response to the first application being refused to read the clipboard information and the number of times that the first application is refused to read the clipboard information reaching a first number threshold.

10. The apparatus for reading and writing clipboard information according to claim 9, wherein the determining circuit is configured to determine the read permission for the clipboard information by:
determining that reading a permission set by default for the read permission for the clipboard information is allowed.

11. The apparatus for reading and writing clipboard information according to claim 9, wherein the determining circuit is configured to determine the write permission for the clipboard information by:
determining that the write permission for the clipboard information is to allow writing, in response to an execution of a clipboard function being executed.

12. The apparatus for reading and writing clipboard information according to claim 9, wherein the determining circuit is configured to determine a read permission for the first application to read the clipboard information by:
when a content format of the clipboard information matches a content format of the clipboard information read by the first application, determining that the first application has the read permission to read the clipboard information; and
when the content format of the clipboard information does not match the content format of the clipboard information read by the first application, determining that the first application does not have the read permission to read the clipboard information.

13. The apparatus for reading and writing clipboard information according to claim 9, wherein the display circuit is further configured to display the first prompt information on the application display interface of the first application by at least one of:
displaying the first prompt information for indicating that the first application is refused to read the clipboard information, in response to the first application being refused to read the clipboard information and the number of times the first application is refused to read the clipboard information reaching a second number threshold, the first prompt information including a selection control for a user to determine whether to display the first prompt information again; and
continuing or stopping displaying the first prompt information, based on the selection control triggered by the user.

14. A non-transitory computer-readable storage medium having stored therein instructions that, when executed by a processor, cause the processor to perform:
acquiring a request for reading and writing clipboard information;
determining a read permission for the clipboard information, in response to the request for reading and writing clipboard information including a request for reading clipboard information, and allowing to read the clipboard information or refusing to read the clipboard information based on the read permission; and
determining a write permission for the clipboard information, in response to the request for reading and writing clipboard information including a request for writing clipboard information, and allowing to write the clipboard information or refusing to write the clipboard information based on the write permission,
wherein:
the read permission and the write permission are set separately;
the request for reading clipboard information is a request for reading clipboard information for a first application to read the clipboard information;
the determining a read permission for clipboard information comprises:
determining the read permission for the first application to read the clipboard information;
after allowing to read the clipboard information or refusing to read the clipboard information, the method further comprises:
displaying first prompt information on an application display interface of the first application, the first prompt information being used to prompt that the first application is allowed to read the clipboard information or that the first application is refused to read the clipboard information; and
the displaying first prompt information on an application display interface of the first application comprises:

displaying the first prompt information for indicating that the first application is refused to read the clipboard information, and automatically hiding the first prompt information after a predetermined time is reached, in response to the first application being refused to read the clipboard information and the number of times that the first application is refused to read the clipboard information reaching a first number threshold.

* * * * *